UNITED STATES PATENT OFFICE.

AMBROSE G. FELL, OF NEW YORK, N. Y.

OBTAINING LEAD SALTS FROM NATIVE ORES.

SPECIFICATION forming part of Letters Patent No. 519,704, dated May 15, 1894.

Application filed April 15, 1893. Serial No. 470,513. (No specimens.)

*To all whom it may concern:*

Be it known that I, AMBROSE G. FELL, a citizen of the United States, and a resident of the city, county, and State of New York, have invented certain new and useful Improvements in Methods of Treating Lead Ores, of which the following is a specification.

My invention relates to the chemical reduction of the ores of lead, such as those known under the names: galena (native sulphide), anglesite (native sulphate), cerussite (native carbonate) and kerasin (native chlorocarbonate) with the view, of ultimately converting the lead in the ore into merchantable oxide (impure or pure litharge) and lead salts, such as the acetate and nitrate.

In order that my method may be more readily understood, I will state how I prefer to carry out my invention in the treatment of galena, which is one of the more common and abundant ores of lead.

The ore is crushed or ground and freed as far as possible from foreign matter. This may be done with any of the usual mechanism employed for crushing ores, and forms no part, properly speaking, of my invention.

*First step.*—In a suitable tank adapted to be heated, and preferably a shallow tank lined with lead and provided with a hood to carry away the gases, I put about three hundred gallons of water, acidulated with eight hundred and twenty pounds of sulphuric acid of 66° Baumé and five hundred and ninety pounds of commercial muriatic acid (which contains about two hundred and thirty-six pounds of real hydrochloric acid), and I add to this acid liquid four hundred and fifty pounds of sulphate of soda. Heat is applied to the tank containing the above mixture and to the mixture is added about two thousand pounds of the crushed ore. Decomposition of the ore ensues with evolution of sulphureted hydrogen and other gases. The operation is maintained for from two to six hours, dependent on the temperature to which the mixture is raised which should not exceed 218° Fahrenheit. If the mixture be stirred the operation will be greatly facilitated. I find about four hours to be the average time required for the operation, which will terminate about thirty minutes after the evolution of sulphureted hydrogen ceases, at which time I add to the mixture at least as much water as that originally employed, (namely, three hundred gallons,) and the mass is then well stirred and allowed to settle. After settling, the clear liquid is drawn off and the sedimentary solid matter in the tank washed with clean water until it is reasonably free from acid. This sedimentary lead compound will now have lost its metallic appearance and will appear as a bluish, heavy, mass, friable when dry and consisting principally of sulphur and chlorine compounds of lead.

*Second step.*—The lead compound resulting from the above treatment is next agitated or mixed (in the same tank, if desired) with a solution of sal-soda (monocarbonate of soda), and the mixture heated moderately up to say 150° Fahrenheit, or, if the soda solution be hot when mixed with the lead compound, then no further heating will be required. The proportion of sal-soda required will vary somewhat even with the same class of ore, but usually about fifteen hundred pounds will suffice for the quantity of ore under treatment, that is two thousand pounds of galena. The operation will be complete as soon as the solution in the tank furnishes to the usual turmeric test a permanent alkaline reaction. The mixture should be thoroughly stirred or agitated and allowed to settle, when the clear liquid, a solution of soda salts, will be drawn off. The resultant lead compound presents an appearance similar to that from the first step but is lighter in tint, and its composition has been materially changed. The next step in the treatment of the lead compound will depend upon what the lead is to be converted into; if into a fine merchantable oxide the next step will be as follows:

*Third step.*—The lead compound derived from the second step, as above, is mixed with about one hundred and forty pounds of nitric acid, then dried and then subjected to the action of heat which will vary in intensity according to the kind of oxide desired. For ordinary litharge, a temperature of about 800° Fahrenheit, continued for about two hours, will suffice; for the other oxides the temperature and duration will be varied proportionately, as will be understood by those skilled in the art. In lieu of nitric acid, an equivalent amount of a nitrate may be employed as an equivalent, nitrate of soda or nitrate of lead serving the purpose very well. If any other nitrate than the nitrate of lead be employed, the product will have to be washed and dried after roasting, but if the acid, or nitrate of lead be used, this will not be necessary. If, instead of an oxide, it is desired to convert the lead into a soluble salt of lead, the lead compound will be treated with a solvent correspondent to the salt desired. For example, if a nitrate is desired, I proceed as follows:

*Fourth step.*—To the lead compound of the second step is added nitric acid diluted with about its weight of water and action goes on until the acid is neutralized, or very nearly so. The solution obtained is evaporated to dryness to obtain the salt. As this salt,—lead nitrate—contains no water of crystallization and no purification is necessary, there is no advantage in crystallizing the salt out of the solution. If another salt than a nitrate is required,—as an acetate, for example,—a similar course will be pursued. In the latter case acetic acid will be employed and the acetate crystallized out of the solution. In case the lead ore treated is argentiferous, or has in it other precious metals, these will remain concentrated in the undissolved residuum from the foregoing fourth step, and this residuum may be treated for their recovery by any of the known methods. The sulphureted hydrogen evolved in the first step of the process may be collected and converted into sulphuric acid for use in the process, in which event the concentration of the acid will be avoided as it may be used in its diluted condition as obtained from the ordinary sulphuric acid chambers. In a like manner the solution drawn off at the termination of the first step of the process may be employed in lieu of a fresh solution in operating on a fresh lot of ore, with the addition of free acid.

I have described my method as applied to the treatment of galena, but the other ores of lead may be treated in substantially the same manner, the only variation necessary to note being the proportion of ore treated. Of galena, about two thousand pounds, as stated, will be the proportion; of anglesite, about three thousand six hundred pounds; of cerussite, about seventeen hundred pounds.

I employ heat in the first step of the process to hasten the operation; the process may as well be carried on at the normal temperature, but it will be very much slower.

In lieu of the hydrochloric acid, I may use in the first step of the process a chloride; and in lieu of the sulphate of soda in that step of the process I may use an equivalent sulphate.

In lieu of sal-soda, I may use in the second step of the process an alkali or an alkaline earth as an equivalent, or another carbonate.

While I do not limit myself to the exact proportions employed in the process, I have given those that I prefer. It is best not to use an excess of hydrochloric acid or its equivalent chloride, in the first step, as it will form soluble lead chlorides which are objectionable for various reasons, one of which is that they are not so readily convertible into insoluble compounds by the action of sodium sulphate as are the lead oxychlorides produced when a smaller proportion of hydrochloric acid is employed.

The bluish, slate colored compound from the first step of the process is of a complex nature, varying according to the ingredients used, their proportions, the temperature employed and the duration of the treatment; it consists of sulphates, basic-sulphates, oxychlorides and double salts formed by the combination of these, together with some unconverted ore. The precise interchange of elements and composition of the products cannot be accurately stated, but as the general compound is basic in its reaction under chemical tests, it is concluded that its compounds are as I have stated. But the variations in its composition does not materially interfere with its successful treatment in the second step of the process, which has, as a resultant, another complex lead compound. This latter consists in the main of sub or basic carbonates, chlorocarbonates, sulfur compounds, and combinations of these, with some unconverted ore as distinct from a carbonate as the product of the first step is distinct from a sulphate. This lead compound from the second step, which is somewhat lighter in shade or color when dry, than that from the first step, and of which from seventy-five per cent. to ninety per cent. is soluble in nitric or acetic acid with which it is treated in the fourth step, although complex, produces a pure salt, as the portions insoluble in the solvent used are inert both to the solvent and the salt, and go into the residue thus enabling the operator to obtain therefrom a purer salt than can be obtained directly from the commercial oxides and carbonates now used for the production of such salts. This residue, which consists mainly of undecomposed and partially decomposed ore, and such small percentages of silver or other precious metal, as exists in the ore, may be allowed to accumulate until a sufficient quantity is obtained to make a charge of ore, when it can be treated precisely as herein described; thus the precious metal will be concentrated conveniently and without extra expense.

The lead compound produced by the second step may be converted into an impure oxide by heat alone and without the aid of nitric acid or an equivalent nitrate, and this oxide, being more economically produced, may have a market value owing to its lower cost, and when treated with a solvent as described in the third step of the process yield corresponding lead salts, but a good commercial oxide such as that obtained from ordinary carbonate cannot be obtained from it by heat alone, as this low oxide thus produced has mixed with it some undecomposed lead salts, sulphides and unconverted ore. By the treatment with nitric acid or nitrate and roasting it is convertible into any of the commercial forms of oxide. Before, however, its treatment for conversion into an oxide by the third step, the silver in it should be extracted, and this may be done after the first step by any of the known methods for the extraction of silver chloride, the silver at that stage of the process being in the form of a chloride.

I prefer to employ for the extraction of the silver a hot concentrated solution of sodium chloride, from which solution the silver chloride is afterward precipitated by dilution with water and the metallic silver obtained therefrom by digesting the chloride with scraps of copper, iron, or zinc. Where the object is to form a soluble salt of lead and not an oxide, the silver in the ore, if any, may be concentrated as before explained.

Lead ores, such as galena for example, usually contain some iron, zinc, copper and silver. In the treatment by the first step all of these metals are converted and dissolved out except the silver, and are drawn off with the liquid; hence only the silver need be considered if the object is to produce a pure oxide. If gold is present, this also will remain in the residuum.

I have described my process as I prefer to carry it out but would now add that I do not wish to be limited to the particular agents employed in the first step. The essential agent in this step is a solution or mixture containing free sulphuric acid. For the muriatic acid or equivalent chloride, nitric acid or equivalent nitrate may be employed. I prefer the muriatic acid only on the score of economy. Sulphuric acid alone does not attack the ore with vigor, but when some other acid is added as an intermediate agent the conditions are at once changed. Moreover, the process may be effected without the aid of the sulphate of soda, but it will proceed much slower.

The addition of the sulphate greatly accelerates the process. Therefore, so far as this first step is concerned, I do not wish to be limited to the admixture of muriatic acid or its equivalent with the sulphuric acid, nor do I wish to be limited to the use of the sulphate.

My process, it will be understood, does not deal with a definite lead compound, but with an ore, containing a number of compounds and very variable in composition, and at no time during the process do I reduce the lead to a metallic state or produce or operate upon either lead sulphate or lead carbonate, *per se*.

I am well aware that the reagents I employ, viz: sulphuric acid, alkalies and heat, have been before used for purifying crude oxides of iron, copper, cobalt and nickel, and especially the latter, with a view of obtaining pure metallic nickel, and this I make no claim to. In such process the nickel oxide remains unchanged the only object of the treatment being to remove foreign substances, such as sulphate of lime, magnesia and silica.

I do not treat metallic oxides at all but native salts as distinguished from oxides, and in fact only lead ores which are native lead salts. These salts are decomposed by the reagents and not in a limited or proper sense purified only by the treatment.

Having thus described my invention, I claim—

1. The herein described method of treating native lead salts or ores direct for the production of merchantable lead compounds, which consists in first decomposing the ground lead ores and converting the lead therein into insoluble lead salts by subjecting said ore to the action of an acid solution containing free sulphuric acid, then separating the lead salts from the solution and subjecting them, under the influence of a moderate heat, to a compound containing an alkaline base for a time, and finally separating the insoluble lead salts from this solution.

2. The herein described method of treating native lead salts or ores direct for the production of merchantable lead compounds, which consists in first decomposing the ground lead ores and converting the lead therein into insoluble lead salts by subjecting said ore to the action of an acid solution containing free sulphuric acid, then separating the lead salts from the solution and subjecting them, under the influence of a moderate heat, to a compound containing an alkaline base for a time, then separating the insoluble lead salts from this solution, and finally roasting said salts.

3. The herein described method of treating lead ores direct for producing lead oxides, which consists in first subjecting the ground ore for a time to the action of an acid solution containing free sulphuric acid and separating the undissolved residue from the solution of soluble salts, then removing any silver that may be contained in the said residue, then subjecting the residue, with heat, to a solution of a compound containing an alkaline base, for a time, and removing the solution of soluble salts, and then roasting the undissolved residue.

4. The herein described method of treating lead ores direct for the production of lead oxides, which consists in first subjecting the ground ore for a time to the action of an acid solution containing free sulphuric acid and separating the undissolved residue from the solution of soluble salts, then subjecting said residue for a time to the action of a solution of a compound containing an alkaline base, with heat, and separating the undissolved residue from the solution of salts, and then mixing with the residue nitric acid or nitrate, drying and roasting.

5. The herein described method of treating lead ores direct for the production of lead oxides, which consists in first subjecting the ground ore for a time to the action of an acid solution containing free sulphuric acid and separating the undissolved residue from the solution of soluble salts, then removing any silver that may be contained in the said residue, then subjecting said residue for a time to the action of a solution of a compound containing an alkaline base, with heat, and separating the undissolved residue from the solution of salts, and then mixing with the residue nitric acid or nitrate, drying and roasting.

6. The herein described method of treating lead ores direct, for the production of soluble salts, which consists in first subjecting the ground ore for a time to the action of an acid solution containing free sulphuric acid and separating from the undissolved residue the solution of salts, then subjecting said undissolved residue to the action of a compound containing an alkaline base for a time, with moderate heat, and separating the solution of salts from the undissolved residue; and finally subjecting the residue to the action of a solvent and by crystallization or evaporation, recovering from the solution the lead salt.

7. The herein described method of treating ores containing lead sulphide direct for the production of lead oxides or salts, which consists in first mixing together the ground ore, sulphuric acid, another inorganic acid, as muriatic or nitric acid, a sulphate, and water, then heating the mixture until the evolution of sulphureted hydrogen, practically ceases, and then drawing off the solution of salts; second, subjecting the undissolved residue to the action of a solution of an alkaline carbonate, with moderate heat, until the mixture shows a permanent alkaline reaction, and then separating the solution from the undissolved residue.

In witness whereof I have hereunto signed my name in the presence of two subscribing witnesses.

AMBROSE G. FELL.

Witnesses:
HENRY CONNETT,
PETER A. ROSS.